3,255,019
PRODUCTION OF FERMENTED DILL PICKLES
George C. Engelland, Blue Island, Ill., assignor to Libby, McNeill & Libby, Chicago, Ill., a corporation of Maine
No Drawing. Filed Aug. 10, 1962, Ser. No. 216,079
9 Claims. (Cl. 99—156)

This invention relates to an improved process for producing fermented dill pickles, and is particularly concerned with the production of fermented dill pickles intended for commercial distribution and which are capable of storage without spoilage for prolonged periods.

In a typical prior art process for preparing fermented dill pickles the cucumbers are placed in wooden barrels, along with dill weed and mixed spices distributed throughout the mass of pickles, and the barrel is filled with 32° salometer brine, after which the barrels are bunged up tightly and rolled to a storage area where they are stood on end. The barrels are vented by an opening in the head to permit the escape of gases produced during fermentation. During fermentation the pickles throw off brine, and consequently the barrels are examined daily at which time fresh brine is added. At the end of about two weeks of such storage, the vent is plugged tightly, the barrels tipped over and stored on the bilge, bung up. Daily examination of the barrels is continued with addition of fresh brine thereto when necessary. The fermented dills produced by such procedure are ready for shipment in from 3 to 6 weeks' time.

In addition to the obvious economic disadvantages which inherently characterize such prior art process e.g., the labor and cooperage costs involved in making the barrels which are necessary for the process, and the cost of supervision and control of the process over the long fermentation period—the resulting product typically has a very short shelf-life, owing to the fact that pickles so produced became soft, mushy and unusable in about six months in storage. For the larger packer this short shelf-life represents a major obstacle to commercial practice of the process and, as a consequence, the fermented dill pickles produced by such prior art methods have disappeared from the market as a major pack item and have been replaced with the "artificial" dill, which is a product inferior in flavor to the fermented, or genuine, dill pickle.

It is an object of the present invention to provide an improved process for preparing genuine dill pickles having the true fermented flavor, and which are characterized by long shelf-life permitting them to be distributed in commerce as a standard shelf item, and not necessarily for quick consumption as was typical with products of the prior art fermentation processes.

A further object of the invention is to provide a process for preparing fermented dill pickles which is considerably more economical to practice than the old fermentation procedures, which process may be conducted in large permanent tanks, and with a minimum of supervision, whereby the labor and material costs incidental to the construction of barrels, the daily examination of the fermentation and frequent rebrining, are avoided.

An additional object is to provide a novel fermented food product.

Other objects and advantages of the invention will be apparent from a study of the description thereof set forth below, wherein a presently preferred specific procedure is described in detail for purposes of illustration.

My investigations have shown that the principal factors contributing to spoilage of genuine dill pickles are enzymes present in the fruit itself, or produced by mold and/or bacteria associated with the fruit, which enzymes attack the pectic materials of the pickles, dissolving them and causing the pickles to soften and thus become unmarketable. Also, yeasts normally present on the cucumbers may grow excessively under certain conditions, adversely affecting the flavor and odor of the final pickle product. For example, conducting the fermentation for a period longer than about 5 days in open tanks, at summer temperatures in excess of 73° F., may result in a yeast growth of sufficient abundance to have a distinct adverse effect on the flavor and odor characteristics of the product.

I have found that the deleterious effects of enzymes and yeasts may be substantially avoided by carrying out the fermentation of the cucumbers for only a limited time, whereby the period of exposure of the fruit to the softening action of the enzymes at their most active stage is reduced to the point where appreciable softening action does not occur.

I have also found that if the fermentation is conducted in a brine having a salt content considerably higher than that normally used in the prior art processes, the high degree of salinity contributes further to reducing the softening activity of the enzymes, while permitting fermentation to proceed to the extent necessary to impart the desirable end-point flavor products.

In accordance with the above-mentioned findings, my process involves subjecting cucumbers to fermentation in a brine having a salt content of between about 7% and about 8% (as determined after equalization of the brine with the juices of the cucumbers), the fermentation being continued until the acid content of the pickles (determined as acetic acid) is between about 0.2% and about 0.3% w./v. At the normal summer temperatures of about 68° to about 80° F. at which the fermentations are carried out, a fermentation time of about 72 hours is sufficient to produce the desired acid content of about 0.2% to about 0.3%, which brief fermentation period, coupled with the high salt content of the brine, is effective to keep the softening activity of the enzymes to the desired low level.

The salt content of the brine after equalization preferably should not be appreciably less than 7% since the inhibition of the softening activity of the enzymes is reduced as the salinity is reduced; concentrations of salt appreciably in excess of about 8% also are not preferred since such higher concentrations would produce too salty a final product. As used herein, the concentration of the salt is by weight relative to the total weight of the fruit and the accompanying solution (percent w./w.), and the salt used to prepare the brine is sodium chloride. The salt concentration of the brine after equalization is preferably determined by squeezing the liquid from several pickles removed from the fermentation mixture (large-sized pickles preferably being first ground up to facilitate removal of the liquid) and then precipitating the chloride from a portion of such liquid with a silver nitrate solution, in accordance with conventional practice. The acid content of the pickles is preferably determined by titrating, with a standard alkali in the usual way, a portion of the liquid expressed from the fermented pickles. Although lactic acid is by far the principal acid produced by the fermentation, other acids may likewise be present in the fermented mixture in small quantities. However, in accordance with conventional practice in this art, the acid present in the fermented mixture is assumed to be acetic acid, and the acidity calculated from the titration is reported as acetic acid.

When the desired acidity of the pickles of about 0.2%–0.3% is reached, which may be determined by titration with alakali of liquid expressed from the fermented fruit, as just described, the pickles are removed from the brine, washed, and packed with a vinegar solution in suitable containers in which the pickles will be marketed, such as glass jars. The jars are then sealed, pasteurized and cooled, and are then labeled and placed in storage ready for shipment to the consumer market.

The vinegar solution in which the pickles are packed for the market will usually contain, besides vinegar, one or more other components such as oil dillweed, dill spice oils, alum, and spice flavors, the specific formula being a matter of taste or choice, as is well konwn. Therefore, as used herein the term vinegar solution is intended to include not only vinegar alone, but also vinegar having in solution or in admixture therewith other components which may impart certain desired flavors or other characteristics to the packed pickles.

Those skilled in this art will understand that lactic acid producing bacteria are naturally present on the cucumber fruit and that, consequently, fermentation will take place spontaneously when the cucumbers are immersed in the brine and a temperature conducive to fermentation is maintained. However, it is sometimes desired (as when the fresh cucumbers are vigorously washed) to incorporate with the cucumber-brine mixture a culture of suitable lactic acid producing organisms such as certain lactobacilli. Such lactic acid producing organisms with which the fermentation mixture may be inoculated are preferably non-gas producing species, as *L. plantarum, L. delbrueckii, L. casei* and *L. lactis*. Any suitable media for culturing these types of organisms may be used, such media being familiar to those skilled in the art. For example, in the preparation of an inoculum of *L. plantarum* the following medium may be used:

Ingredients: Amounts, grams
  Yeast extract _____ 10
  Tryptone _____ 1
  Dipotassium phosphate _____ 1
  Sucrose _____ 25
  Sodium chloride _____ 20
  Water, q.s. to 1000 ml.

In producing an inoculum of *L. plantarum* using the above medium, the medium is first sterilized by conventional techniques. A culture of *L. plantarum* is then added to the medium, and the medium incubated at about 90° F. until a substantial number of organisms are produced. The incubation time and temperature are not particularly critical as those skilled in the art will appreciate, and a satisfactory production of organisms will be produced when the inoculated medium is incubated for from 24 to 96 hours at temperatures ranging between 100° F. to 80° F. inocula of the other organisms mentioned above may be prepared in the same way. When such inocula are used to inoculate the cucumber-brine fermentation mixture, the amount of inoculant used may be about 2.0% by volume relative to the volume of the said mixture.

As noted above, an important feature of my invention is to carry out the fermation of the cucumbers in a brine having a salt content between about 7% and about 8% w./w. after equalization with the cucumbers in the mixture. Since the cucumbers contain a very high percentage of water which tends to come into equilibrium with the brine, the initial concentration of salt in the brine is reduced by the addition of the cucumbers to the brine, and the final concentration of salt in the brine (after equalization) is therefore dependent on the salt content of the initial brine, and may be increased by the addition of dry salt to the brine along with the cucumbers. Where the salt concentration of the final brine (after equalization) is dependent entirely upon the salt content of the initial brine, it is evident that the initial brine must have a considerably higher salt concentration than the 7–8% required for the final brine. Where the amount of brine used in the fermenation is not substantially greater than that needed to cover the charge of cucumbers, which is the usual situation, dependence on the salinity of the initial brine to supply the desired high salt concentration and the final brine (after equalization) would require the concentration of the initial brine to be about 80° salometer, or about 21% salt, which would equalize at about 8% salt in about 48 hours, in a batch wherein about 600 lb. of cucumbers are immersed in about 48 gallons of brine. However, it is not recommended that an initial brine of such high salinity be used in the present process since desirable Lactobacillus species of bacteria are sensitive to salt and the higher salt levels in such initial brine would tend to retard their growth and to delay acid production, and would also permit greater possible growth of yeasts which are not sensitive to salt, both of which results are undesirable. Accordingly, in the preferred manner of conducting my fermentation process, the salt content of the equalized final brine is derived only in part from the initial brine, and the remainder of the salt content is supplied by the addition of dry salt with the cucumbers to the initial brine. It is therefore preferred that the initial brine have substantially the same concentration of salt as that of the final brine solution following equalization, and that the dilution of the initial brine by the addition of the cucumbers will be made up by the concurrent dissolution in the brine of the added dry salt. However, various changes in the concentration of the initial brine, with corresponding changes in the amount of dry salt added thereto with the cucumbers, may of course be made, as is well understood by those skilled in the art.

In accordance with my preferred procedure I introduce into the fermenting tank about ½ the quantity of brine intended to be used for the fermentation, such brine having a salt concentration of between about 7% and about 8% w./w. I then add the cucumbers and dry salt concurrently to the tank until the tank is substantially filled, and thereafter apply a close fitted cover over the the cucumbers, the cover being keyed or weighted down. The remainder of the brine, of the same concentration as the portion initially placed in the tank, is then added to the tank, the total volume of the brine being sufficient to cover the pickles. Preferably, in adding the cucumbers and dry salt to the tank, the dry salt is spread over the fruit at a rate proportionate to the rate at which the cucumbers are added, so that the added salt will be distributed more or less uniformly throughout the tank among the cucumbers. If desired, all of the initial brine, having a salt concentration of about 7% to 8% may be put into the tank at one time, and thereafter the cucumbers and dry salt are added concurrently to such initial brine.

The procedure wherein dry salt is added to the initial brine concurrently with the cucumber addition is preferred because in such procedure the cucumbers are not exposed to such high-concentration brines as would have a deleterious effect on the growth and acid production of the Lactobacilli, and yet the salt concentration is always maintained at a safe level to inhibit the softening action of the enzymes because as the initial brine tends to become diluted in equalizing with the water in the cucumbers, the dry salt is going into the solution to build up the salt concentration of the brine and thereby keep the brine at about the desired strength.

After charging the tank as described above, the fermentation begins spontaneously and is allowed to continue until the acid content of the pickles has reached about 0.2% to about 0.3%, as described above, whereupon the resulting pickles are removed from the brine, washed and packed into containers with a suitable packing solution. The containers are then hermetically sealed, pasteurized, and thereafter cooled and labeled. The packing solution is preferably a vinegar solution containing suitable flavoring components.

The strength of the vinegar used for packing the fermented pickles is preferably such that when it is packed with the pickles it produces, in combination with the salt and acid contents of the pickles, a finished product containing about 0.5% to about 0.7% (w./v.) acid (i.e., about 5 to 7 grain acid) and about 4.5% to 5.0% (w./w.) salt.

The proper vinegar strength for use in a given commercial operation in accordance with the invention will of course be determined by previous experience, and may be checked by periodic tests for acidity and salinity of the finished product. Such tests are preferably performed on liquid expressed from pickles (after they have come into equilibrium with the vinegar packing solution), by titrating a portion of such liquid with standard alkali for determination of its acid content, and by precipitating the chloride from a separate portion of such liquid with a silver nitrate solution for determination of the salt content, in the manner previously described.

The acidity of the finished product is determined in part by taste, and therefore final acidities somewhat outside the preferred range of 0.5%–0.7% may be used. However, it will be understood that with lower acidities the risk of spoilage would increase as the acidity approached the minimum for effective pasteurization, and higher acidities would tend to produce undesirable sharpness of flavor. The salt content range of 4.5% to 5.0% is not critical, it being dictated primarily by taste, and accordingly salt concentrations in the finished product may be outside this range if desired.

Pasteurization of the packed product is effected by maintaining the packed containers in an atmosphere of about 195° F. until the temperature, measured at the center of pickles from the bottom of the container, is between about 165° F. and about 175° F.

It will be seen from the foregoing that the process of the invention is easily controlled and the fermentation period is limited to substantially the minimum time required to develop the desired end-point flavor products of fermentation, after which fermentative action is stopped as by pasteurization, as described above. Such limited fermentation limits the development and activity of undesirable pickle-softening organisms and enzymes which commonly occur in fermented dill pickles produced by methods of the prior art wherein the fermentations proceed for from 3 to 6 weeks, or more, prior to packing. Such prior art methods permitted full development and action of these undesirable softening organisms and enzymes, which in turn had an adverse effect on the texture quality of the product, limiting the shelf-life of the pickles to a comparatively short time. On the other hand, with the instant process which is characterized by close control over the fermentation procedure as described above, the fermented dill pickles produced thereby have a substantially improved shelf-life, i.e., about 18 months, compared to the 6 months or less for the fermented dills produced by the old procedure. As a consequence, fermented dills produced by the instant process can be packed as a standard shelf item, similar to other pickled products, and need not be marketed for quick consumption, as do fermented dills produced by old processes.

In addition to the foregoing advantages, as well as the economic advantages resulting from elimination of the daily inspection requirements and the cooperage costs associated with the old method of making genuine dill pickles, the instant process has the further advantage of permitting salvage of the dill stocks as brine stock pickles if, for any reason, there occurs a breakdown in the packing operations. This advantage follows from the fact that the spice flavors are not added to the product until after the fermentation has been completed, and the product is actually being packed.

My invention will now be described more specifically in the following example.

*Example*

| Ingredient | Unit | Quantity |
|---|---|---|
| Fresh cucumbers, #2 size | pounds | 1000 |
| Salt | do | 80 |
| Brine, 30° salometer | gallons | 80 |

The foregoing ingredients aggregate about 200 gallons in volume. A wooden tank, which is substantially filled by the above ingredients, is used for the fermentation.

About 40 gallons of the brine (30° salometer) are first placed in the tank. The cucumbers and the dry salt are then added to the tank concurrently, the dry salt being spread over the fruit during such addition. A close-fitted cover is then placed over the cucumbers and weighted down into contact therewith, and then the remaining 40 gallons of the 30° salometer brine is added to the tank. The total quantity of the initial brine (80 gal.) should be sufficient to cover the cucumbers. However, if necessary, an additional quantity of such brine may be added for this purpose. Fermentation is then allowed to proceed in normal ambient summer temperature (e.g., from about 68° to about 80° F.). Fermentation is allowed to continue until the acid content of the pickles reaches a level of between about 0.2% and about 0.3% w./v. (as acetic acid) which may be determined by alkali titration of liquid expressed from the fermented fruit, as previously described. Under the above-mentioned conditions the fermentation time is about 72 hours. The fermented pickles are removed from the brine, preparatory to packing, and the initial brine in which the pickles were fermented is discarded. By so discarding the original brine, the number of viable organisms and pectolytic softening enzymes associated with the packed product are substantially reduced, whereby the effectiveness of the pasteurization procedure to which the packed pickles are subjected is considerably increased.

The pickles removed from the original brine are washed thoroughly in water, and preferably brushed, and, after broken and other unsatisfactory stocks are sorted out, are packed into glass jars, substantially filling the latter. About 20 ounces of pickles are introduced into a quart size jar, and for such quantity about ½ ounce of fresh dillweed is also placed in the jar, preferably prior to the addition of the pickles thereto. The jars are then filled with a vinegar solution, leaving about ¼ inch head-space, after which the jars are hermetically sealed in a capping machine.

A typical vinegar solution suitable for packing in the jars with the pickles is the following.

| Ingredients: | | Quantity |
|---|---|---|
| 100 gr. vinegar | gal | 120 |
| Oil dillweed | ml | 2000 |
| Regular dill spice oils | ml | 1000 |
| Alum | lb | 12.5 |
| Spice flavors, to taste. | | |
| Water, q.s. to 1000 gal. | | |

The acidity of the above vinegar solution is about 10–12 grain, and the vinegar solution is preferably brought to a temperature of about 140° F. before introducing it into the jars with the pickles. Under the circumstances described, the final acidity of the finished product is between about 0.5% and about 0.7% w./v., and the final salt content thereof is between about 4.5% and about 5.0% w./w.

The filled jars are then hermetically sealed in a conventional capping machine, and the sealed jars conveyed through a heating chamber, such as an oven, for pasteurization. The atmosphere in the heating chamber is maintained at about 195° F. and the jars are maintained in such atmosphere until the temperature of the pickles at the bottom of the jars, measured at the center of the pickles, reaches a minimum of 165° F. This pickle-temperature, in cooperation with the acidity of the packing medium, is sufficient to pasteurize the product. With an oven temperature of about 195° F., a residence time therein of about twenty minutes, for quart jars of pickles, is sufficient for pasteurization. Preferably, the center-of-pickle temperature, as previously described, should not exceed about 175° F. since the pickles tend to soften at such elevated temperatures, especially in the presence of the acid packing medium. Those skilled in the art of pasteurization will understand that other time-temperature relationships than that just described may be used to effect pasteurization of the pickles.

After pasteurizatoin, the jars are conveyed through a cooling chamber where they are cooled to about 115° F., or less, after which they are labeled and packed in cartons for shipment in commerce.

While the above description discloses preferred and practical embodiments of the method of making the fermented dill pickles of my invention, it will be understood that modifications and variations therein may be effected without departing from the spirit and scope of the invention as defined in the appended claims.

I claim:

1. The process of producing genuine dill pickles which comprises subjecting cucumbers to fermentation in a salt brine having a salt concentration of between about 7% and about 8% after equalization with said cucumbers, continuing said fermentation until the acid content of the resulting pickles is between about 0.2% and about 0.3% determined as acetic acid, and then separating said fermented pickles from said brine, washing said pickles, packing the washed pickles in a container with a vinegar solution, hermetically sealing said container, and pasteurizing the contents of said container.

2. The process of producing genuine dill pickles by the fermentation of cucumbers in a salt brine, which comprises adding cucumbers and dry salt concurrently to a tank containing the brine to be used in the fermentation, the concentration of salt in said brine and the quantity of said dry salt being such that the resulting brine has a salt concentration of between about 7% and about 8% after equalization with the tank contents, allowing said cucumbers to ferment until the acid content of the resulting pickles is between about 0.2% and about 0.3% determined as acetic acid, and then separating said fermented pickles from said brine, washing said pickles, packing said washed pickles with a vinegar solution in a container, hermetically sealing said container, and pasteurizing the contents of said container.

3. The process of producing genuine dill pickles by fermentation of cucumbers in a salt brine, which comprises adding cucumbers to a tank containing a portion of the brine to be used in the fermentation, spreading dry salt over said cucumbers during the addition of the latter to said tank, adding the remainder of said brine in an amount to cover said cucumbers, the concentration of salt in said brine and the quantity of said dry salt being such that the resulting brine has a salt concentration of between about 7% and about 8% after equalization with said tank contents, allowing said cucumbers to ferment until the acid content of the resulting pickles is between about 0.2% and about 0.3% determined as acetic acid, and then separating said fermented pickles from said brine, washing said pickles, packing the washed pickles in a container with a vinegar solution, hermetically sealing said container, and pasteurizing the contents of said container.

4. In a process for producing genuine dill pickles by the fermentation of cucumbers in a salt brine, wherein the fermented cucumbers are removed from said brine, washed, and packed in a vinegar solution, the improvement which comprises carrying out said fermentation in a brine having a concentration of salt of between about 7% and about 8% after equalization with said cucumbers, and discontinuing said fermentation when the acid content of the resulting pickles is between about 0.2% and about 0.3% determined as acetic acid.

5. The process in accordance with claim 4, wherein the mixture of cucumbers and brine is inoculated with a culture of at least one species of non-gas-forming lactic acid producing bacteria.

6. In a process for producing genuine dill pickles by the fermentation of cucumbers in a salt brine, wherein the fermented cucumbers are removed from said brine, washed, and packed in a vinegar solution, the improvement which comprises preparing a fermentation mixture of brine, cucumbers and dry salt, the concentration of salt in said brine and the quantity of said dry salt being such that the resulting brine has a salt concentration of between about 7% and about 8% after equalization with said cucumbers, and allowing said cucumbers to ferment until the acid content of the resulting pickles is between about 0.2% and about 0.3% determined as acetic acid.

7. The process of producing genuine dill pickles which comprises adding cucumbers to a tank containing a quantity of brine having a salt concentration of between about 7% and about 8%, said quantity comprising about one-half the amount of brine to be used in said process, spreading dry salt over said cucumbers during the addition of the latter to said tank, adding to said tank the remainder of said brine having a salt concentration of between about 7% and about 8%, the amount of said brine and the quantity of said dry salt being such that the resulting brine has a salt concentration of between about 7% and about 8% after equalization with the tank contents, allowing said cucumbers to ferment until the acid content of the resulting pickles is between about 0.2% and about 0.3% determined as acetic acid, and then separating said fermented pickles from said brine, washing said pickles, packing the washed pickles with a vinegar solution in a container, hermetically sealing said container, and pasteurizing the contents of said container.

8. A process in accordance with claim 7, wherein the acidity and volume of said vinegar solution are such that the packed pickles have an acidity of between about 0.5% and about 0.7%, and have a salt content of between about 4.5% and about 5.0%.

9. In a process for producing genuine dill pickles by the fermentation of cucumbers in a salt brine, the improvement which comprises adding the cucumbers to a brine having a concentration of salt between about 7% and about 8%, adding additional salt so as to maintain said salt concentration in the brine after equalization with said cucumbers, allowing the cucumbers to ferment in said brine, and discontinuing said fermentation when the acid content of the resulting pickles is between about 0.2% and about 0.3% determined as acetic acid.

References Cited by the Examiner

UNITED STATES PATENTS

| | | | |
|---|---|---|---|
| 1,003,320 | 9/1911 | Baumann | 99—222 |
| 1,194,755 | 8/1916 | Lasche | 99—222 |
| 1,829,932 | 11/1931 | Hey | 99—156 |
| 2,322,880 | 6/1943 | Pollak | 99—156 |

A. LOUIS MONACELL, *Primary Examiner.*